US008342905B2

(12) United States Patent
Miyahara et al.

(10) Patent No.: US 8,342,905 B2
(45) Date of Patent: Jan. 1, 2013

(54) OPTICAL DISK RESTORATION METHOD AND APPARATUS

(75) Inventors: Takakazu Miyahara, Minamisatsuma (JP); Terumasa Miyahara, Minamisatsuma (JP); Kazutoshi Chijiiwa, Minamisatsuma (JP)

(73) Assignee: Elm Inc., Minamisatsuma (JP)

( * ) Notice: Subject to any disclaimer, the term of this patent is extended or adjusted under 35 U.S.C. 154(b) by 369 days.

(21) Appl. No.: 12/679,427

(22) PCT Filed: Aug. 31, 2009

(86) PCT No.: PCT/JP2009/004270
§ 371 (c)(1),
(2), (4) Date: Mar. 22, 2010

(87) PCT Pub. No.: WO2011/024241
PCT Pub. Date: Mar. 3, 2011

(65) Prior Publication Data
US 2011/0143636 A1    Jun. 16, 2011

(51) Int. Cl.
*B24C 3/00*    (2006.01)
(52) U.S. Cl. ............... 451/2; 451/7; 451/41; 451/60; 451/285; 451/446
(58) Field of Classification Search ............... 451/41, 451/60, 283–290, 7, 2, 446
See application file for complete search history.

(56) References Cited

U.S. PATENT DOCUMENTS

| | | | | |
|---|---|---|---|---|
| 4,179,852 A | * | 12/1979 | Barnett | 451/63 |
| 4,561,142 A | * | 12/1985 | Mischenko et al. | 15/97.1 |
| 5,099,618 A | * | 3/1992 | Schmid | 451/57 |
| 5,102,099 A | * | 4/1992 | Brown et al. | 451/283 |
| 5,113,622 A | * | 5/1992 | Nishiguchi et al. | 451/7 |
| 5,305,554 A | * | 4/1994 | Emken et al. | 451/113 |
| 5,593,343 A | * | 1/1997 | Bauer | 451/254 |
| 5,674,115 A | * | 10/1997 | Yamashita et al. | 451/289 |
| 5,797,789 A | * | 8/1998 | Tanaka et al. | 451/289 |

(Continued)

FOREIGN PATENT DOCUMENTS

JP    A-9-323261    12/1997

(Continued)

OTHER PUBLICATIONS

Nov. 2, 2009 Written Opinion issued in International Patent Application No. PCT/JP2009/004270 (with translation).

(Continued)

*Primary Examiner* — George Nguyen
(74) *Attorney, Agent, or Firm* — Oliff & Berridge, PLC (57) ABSTRACT

An optical disk restoration apparatus and optical disk restoration method are provided, which are capable of achieving a high level of capability of restoring a scratched optical disk, without consuming the time and labor of an operator, while reducing the production cost of the apparatus. During a polishing process, an appropriate amount of a polishing agent is dropped onto the readout surface of the optical disk by a polishing agent supply pump to continuously supply the polishing agent to the interface between the optical disk and polishing pads, while a polishing water supply pump is operated to replenish the polishing agent with moisture evaporated by the polishing heat. By this mechanism, the amount and physical properties of the polishing agent at the interface between the optical disk and the polishing pads are appropriately maintained for a long period of time, so that the restoration capability is maintained at high levels.

12 Claims, 7 Drawing Sheets

U.S. PATENT DOCUMENTS

| | | | |
|---|---|---|---|
| 6,099,393 A | 8/2000 | Katagiri et al. | |
| 6,116,987 A * | 9/2000 | Kubo | 451/41 |
| 6,261,158 B1 | 7/2001 | Holland et al. | |
| 6,312,320 B2 * | 11/2001 | Sato et al. | 451/285 |
| 6,846,228 B2 * | 1/2005 | Lin | 451/290 |
| 7,625,263 B2 * | 12/2009 | Miyahara et al. | 451/287 |

FOREIGN PATENT DOCUMENTS

| | | |
|---|---|---|
| JP | A-10-329009 | 12/1998 |
| JP | A-2000-153450 | 6/2000 |
| JP | A-2002-86338 | 3/2002 |
| JP | A-2002-541649 | 12/2002 |
| JP | A-2003-243343 | 8/2003 |
| JP | A-2004-39155 | 2/2004 |
| JP | A-2004-55018 | 2/2004 |
| JP | A-2005-310211 | 11/2005 |
| JP | A-2006-167440 | 6/2006 |
| JP | A-2007-301712 | 11/2007 |
| JP | U-3144733 | 9/2008 |
| JP | A-2008-302469 | 12/2008 |
| WO | WO 00/35627 | 6/2000 |

OTHER PUBLICATIONS

Mar. 13, 2012 Notification of Reason for Rejection issued in Japanese Patent Application No. 2010-511416 (with translation).

* cited by examiner

OPTICAL DISK RESTORATION METHOD AND APPARATUS

TECHNICAL FIELD

The present invention relates to a method and apparatus for restoring an optical disk, such as a compact disk (CD), digital versatile disk (DVD) or blue-ray disk (BD), by removing scratches and other defects from its readout surface.

BACKGROUND ART

Optical disks, such as CDs, DVDs and BDs, are made of a transparent resin (although some products are colored within the visible light region) and normally have a thickness of approximately 1.2 min and a diameter of 120 mm, with a central hole of 15 mm in diameter.

Figure 8:
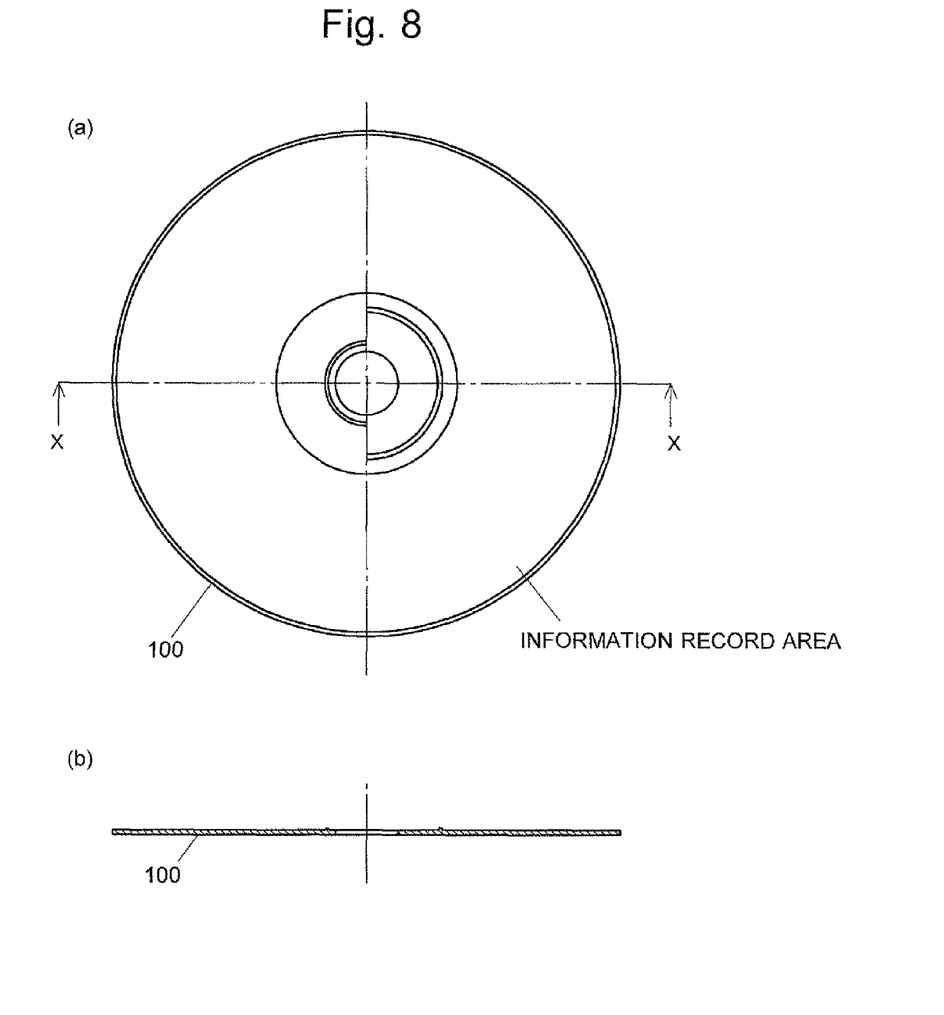
FIG. 8 is a diagram showing the structure of a common type of optical disk, where (a) is a plan view and (b) is a sectional view at the arrowed line X-X in (a), each view showing a CD or DVD on the right side and a BD on the left side.

FIG. 8 is a diagram showing the structure of a commonly used optical disk 100, where FIG. 8(a) is a plan view and FIG. 8(b) is a sectional view at the arrowed line X-X in FIG. 8(a), each view showing a CD or DVD on the right half and a BD on the left.

An optical disk holds information in its specific layer; in CDs, this layer is located on the side opposite to the readout surface, while DVDs have this layer at a depth of approximately 0.6 mm from the readout surface. In BDs, the information is recorded in a layer 0.1 mm below the readout surface. The information held in the information record layer is read by throwing a laser beam onto this layer through the readout surface and detecting a reflected beam coming from the same layer.

Therefore, if the readout surface of the optical disk is scratched, it is in principle impossible to correctly read information because the laser beam for reading the information and the reflected light coming from the information record layer are reflected or scattered at the scratched portion.

As already stated, the information held by the optical disk is not recorded on the readout surface but in the information record layer beneath the surface. Therefore, a scratch on the readout surface does not directly damage the information. Accordingly, if the information record layer is safe, it is possible to read the information once more by removing the scratch from the readout surface.

Figure 9:
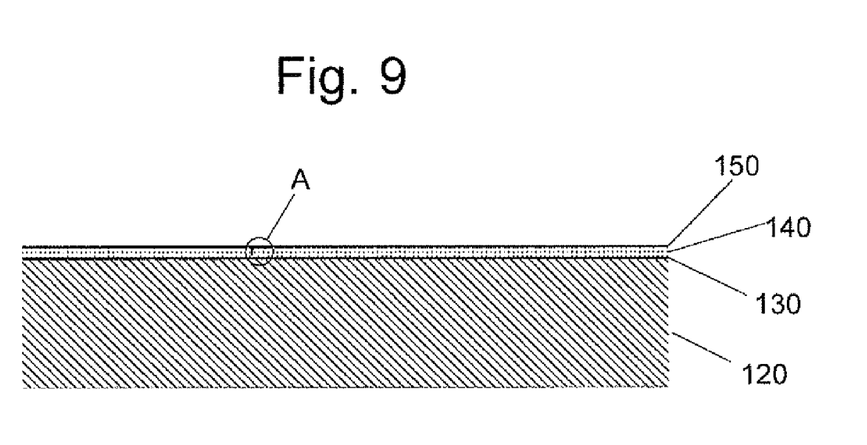
FIG. 9 is an enlarged sectional view of a single-layer BD.

The principle of restoring an optical disk is hereinafter described using FIGS. 9 and 10. FIG. 9 is an enlarged sectional view of a single-layer BD with the readout surface directed upwards, in which an information record layer 130 formed on a substrate 120 made of a polycarbonate resin or similar materials having a thickness of approximately 1.1 mm is covered by a cover layer 140 of approximately 0.1 mm in thickness and a hard-coat layer 150 of 2 to 5 micrometers in thickness.

Figure 10:
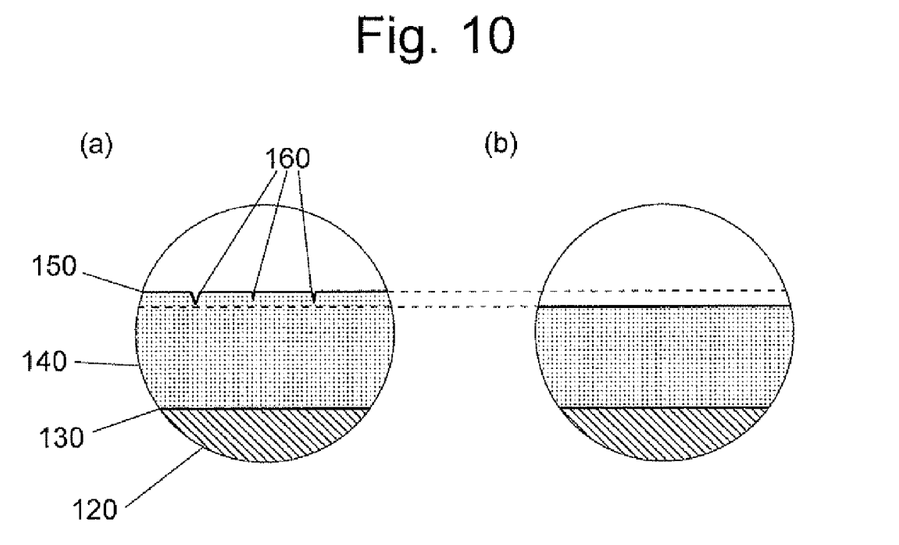
FIG. 10 is an enlarged view of the portion inside the circle shown in FIG. 9, where (a) shows the portion before restoration, with a scratch thereon, and (b) shows the portion after its surface is removed by a restoration process.

FIGS. 10(a) and 10(b) are both an enlarged sectional view of an optical disk with the readout surface directed upwards, showing the portion corresponding to the area surrounded by the circle A in FIG. 9. FIG. 10(a) shows the readout surface with scratches 160, and FIG. 10(b) shows the same portion with the scratch ground away.

In this manner, the optical disk can be restored by grinding away the disk surface by a thickness approximately equal to the depth of the scratch and then performing a mirror-polishing process.

Optical disk restoration apparatuses for polishing an optical disk to remove a scratch from its readout surface in the previously described manner have been conventionally known (for example, refer to Patent Document 1). An example of the conventional optical disk restoration apparatuses includes a rotary table, on which an optical disk to be restored can be set, a disk-shaped polishing body, and other components. This apparatus polishes the readout surface of the optical disk by rotating the polishing body and the rotary table while maintaining the polishing body in contact with the readout surface.

PRIOR ART DOCUMENT

Patent Document

Patent Document 1: Japanese Unexamined Patent Application Publication No. 2005-310211

DISCLOSURE OF THE INVENTION

Problems to be Solved by the Invention

The polishing methods by the aforementioned conventional optical disk restoration devices can be classified into three types. One method is called a dry type, in which the disk is polished with a buff made of sponge, felt, cloth or similar material holding a relatively high-viscosity polishing agent. The second method is called a wet type, in which the disk is initially ground with sandpaper or similar material while water is supplied onto it, after which a mirror-polishing process using a buff with a polishing agent is performed as in the dry process. The third type is a hybrid of these two types; a colloidal high-viscosity polishing agent is diluted to prepare a milk-like low-viscosity liquid, and a polishing process using a buff is performed with the liquid continuously supplied onto the disk by a pump or similar device.

The first method, i.e. dry polishing, can be performed by simple-structured apparatuses, which are offered at low prices. However, this process has a problem in that the polishing function of the buff and polishing agent mainly continues only during the period of time where the polishing agent between the buff and the disk is in a wet state; the polishing power rapidly decreases if the polishing agent becomes dry. Therefore, its restoration capability is low and a long restoration time is required for a deep scratch. Another problem is that an operator needs to perform the time-consuming task of previously applying the polishing agent every time the restoration is initiated.

In the second method, i.e. wet polishing, the continuous supply of water onto the disk during the polishing process suppresses heat generation and removes scraped chips. Therefore, a powerful grinding process using sandpaper or the like can be performed to achieve a high level of restoration capability. However, performing the two polishing processes, i.e. the rough polishing by sandpaper or the like and the finish polishing by a buff with a polishing agent, requires an apparatus having a complex structure, which tends to be expensive.

In the third polishing method in which a diluted polishing agent is continuously supplied, the restoration capability is higher than in the case of the dry-type restoration apparatus due to the continuous supply of the polishing agent onto the disk during the restoration period. However, the continuous supply of the milk-like polishing agent tends to contaminate the disk. Therefore, it is necessary to consume time and labor to wash or clean the restored disk.

The present invention has been developed in view of these problems, and its objective is to provide an optical disk restoration apparatus and optical disk restoration method whereby a high level of capability of restoring a scratched optical disk is achieved without consuming time and labor of an operator while reducing the production cost of the apparatus.

Means for Solving the Problems

An optical disk restoration apparatus according to the present invention aimed at solving the aforementioned problems is a dry-type optical disk restoration apparatus for polishing a readout surface of an optical disk to be restored, by rotating a polishing pad holding a polishing agent and the optical disk relative to each other in a contact state, which is characterized by including:

a) a polishing agent supply means for supplying a polishing agent to the readout surface of the optical disk or the polishing pad;

b) a polishing water supply means for supplying a polishing water, or polish-assisting water, to the readout surface of the optical disk or the polishing pad; and e) a supply control means for intermittently operating the polishing agent supply means to maintain the amount of the polishing agent held in the polishing pad during the polishing process, and for intermittently operating the polishing water supply means to replenish the polishing agent with moisture evaporated by a polishing heat (i.e. heat generated through polishing).

The optical disk restoration apparatus according to the present invention is a dry-type restoration apparatus for polishing a disk by a polishing agent and a polishing pad (e.g. a buff) and yet includes a polishing agent supply means for supplying the polishing agent to the surface to be polished and a polishing water supply means for supplying polishing water (or actually polish-assisting water) to the surface being polished. The supply control means intermittently operates the polishing agent supply means to supply an appropriate amount of the polishing agent to the interface between the polishing pad and the optical disk at appropriate points in time so that the polishing agent at the interface will remain effective for a long period of time. The supply control means also intermittently operates the polishing water supply means to supply an appropriate amount of the polishing water to the surface being polished at appropriate points in time so as to cool the optical disk, which generates heat due to the polishing, and to restore the polishing power, which deteriorates as the polishing agent becomes dry.

An optical disk restoration method according to the present invention aimed at solving the aforementioned problems is an optical disk restoration method including a dry polishing process for polishing a readout surface of an optical disk by rotating a polishing pad holding a polishing agent and the optical disk relative to each other in a contact state, which is characterized in that the polishing process includes:

a) a polishing agent supply process for intermittently supplying the polishing agent to the readout surface of the optical disk or the polishing pad to maintain the amount of the polishing agent held in the polishing pad during the polishing process; and b) a polishing water supply process for intermittently supplying a polishing water to the readout surface of the optical disk or the polishing pad to replenish the polishing agent with moisture evaporated by a polishing heat.

Effects of the Invention

The optical disk restoration apparatus and optical disk restoration method according to the present invention are a dry-type apparatus or method for restoring an optical disk by performing a polishing process using a polishing pad with a polishing agent held therein, and yet have the means for intermittently supplying the polishing agent to the interface between the polishing pad and the optical disk during the polishing process and for intermittently replenishing the polishing agent with moisture evaporated by the frictional heat. By this mechanism, the amount and physical properties of the polishing agent at the interface between the polishing pad and the optical disk are appropriately maintained for a long period of time, so that its restoration capability is higher than that of the conventional dry-type restoration apparatuses and methods.

Conventional dry-type restoration apparatuses do not have any means for supplying a polishing agent to the disk surface during the polishing process. Therefore, it is necessary to manually apply a polishing agent before the restoration process is initiated, which means that the polishing agent can be applied only one time for each polishing process.

The polishing method using a buff and polishing agent provides an expected level of polishing power when an appropriate amount of polishing agent with appropriate physical properties is present between the buff and the disk. However, this method is accompanied by heat generation, which makes the polishing agent rapidly dry, thereby maintaining its appropriate physical properties only for a short period of time. Therefore, for example, when the optical disk should be ground by 1 micrometer, the process of applying the polishing agent and performing the polishing operation must be repeated multiple times, which consumes the time and labor of the operator.

On the other hand, the restoration apparatus according to the present invention has the polishing agent supply means for supplying a polishing agent to the disk surface during the polishing process, whereby the polishing agent can be supplied multiple times in one polishing process. The apparatus also has the polishing water supply means for supplying a trace amount of water to the disk surface during the polishing process, whereby the polishing capability, which deteriorates as the polishing agent dries, can be restored. Accordingly, the polishing power can be maintained for a long period of time, so that even a deep scratch can be removed without requiring manual tasks by an operator.

The optical disk restoration apparatus according to the present invention restores an optical disk by simply polishing it with a polishing pad and a polishing agent. Such an apparatus can be simpler in structure and lower in production cost than a wet-type restoration apparatus. As compared to the system using a diluted polishing agent, which also has a simple structure, the present apparatus is advantageous in that it hardly contaminates optical disks and hence does not require the troublesome task of washing the restored disk.

BEST MODE FOR CARRYING OUT THE INVENTION

Figure 1:
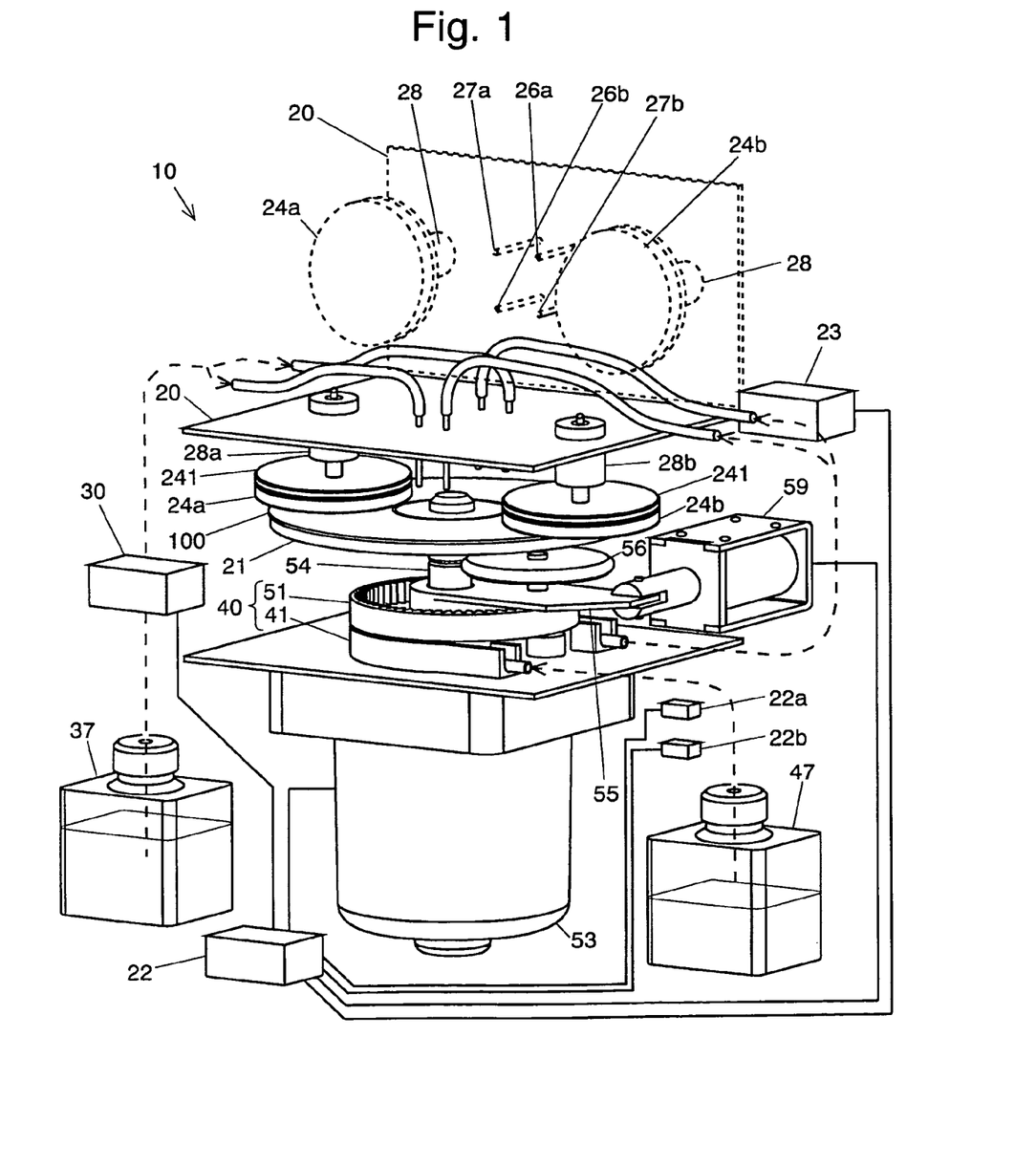
FIG. 1 is a model diagram showing a schematic structure of an optical disk restoration apparatus according to the present invention.

FIG. 1 is a perspective view showing the internal structure of a restoration apparatus 10 according to the present invention. The restoration apparatus 10 includes a restoration table 21, on which an optical disk to be restored can be set, and a motor 53 for rotating the restoration table 21. The restoration table 21 is circumferentially surrounded by plate members (not shown). The space above the restoration table 21 is closed by a lid 20 fanning a ceiling that is free to open. When the polishing of the optical disk 100 is completed, the lid 20 is opened by a lid-opening mechanism 23. Various kinds of mechanism are available for the lid-opening mechanism 23. One example uses a motor or similar drive mechanism for opening the lid 20. Another example includes a spring for pressing the lid 20 toward the opened position, a hook for holding the lid 20 in the closed position, and a hook-release mechanism for releasing the hook to open the lid 20. The lid 20 has polishing pad holders 241 attached on its inside face in a free-to-rotate manner. In the restoration process, the polishing pads 24a and 24b attached to the lower sides of the polishing pad holders 241 are pressed onto the optical disk 100 by an appropriate pressure.

A polishing agent tank 47 retaining a polishing agent is connected via a polishing agent supply pump 40 (which will be described later) to two polishing agent supply nozzles 26a and 26b for supplying the polishing agent onto the optical disk 100. Similarly, a polishing water tank 37 retaining polishing water is connected via a polishing water supply pump 30 (which will also be detailed later) to two polishing water supply nozzles 27a and 27b for supplying the polishing water onto the optical disk 100.

The motor 53, polishing water supply pump 30, lid-opening mechanism 23 and other components operate according to the instructions from a controller 22.

Although the polishing pads 24a and 24b, polishing agent supply nozzles 26a and 26b and polishing water supply nozzles 27a and 27b in the present embodiment are all identified in pairs, necessary capabilities can be achieved as long as one or more of each of these components are present.

Figure 2:
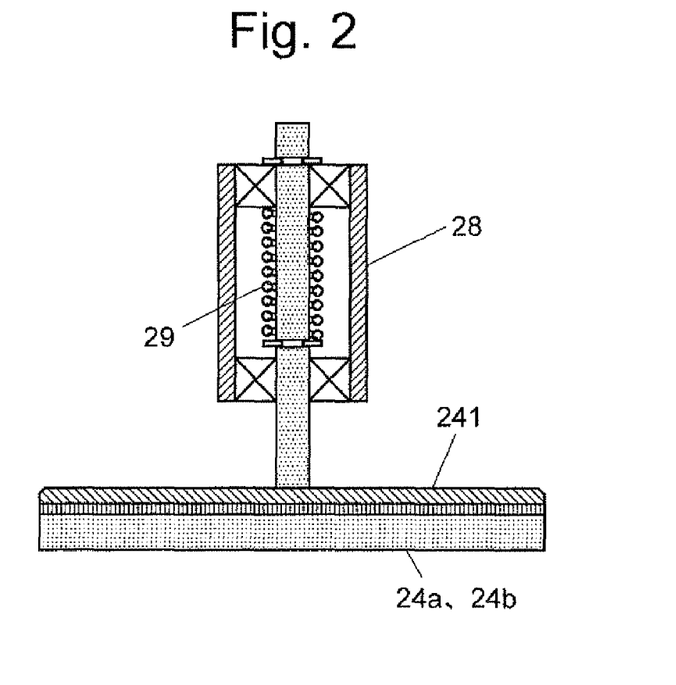
FIG. 2 is a sectional view of a polishing pad.

As a method for pressing the polishing pads 24a and 24b onto the optical disk 100 by an appropriate pressure, it is possible to provide, as shown in FIG. 2, a coil spring 29 in a bearing 28 holding the rotation shaft of the polishing pad holder 241 to press the polishing pads 24a and 24b on the lower side of the polishing pad holder 241 onto the optical disk 100 by an appropriate pressure.

There are other alternatives for this task. For example, a plurality of coil springs may be provided in the pad holder. It is also possible to use a pad made of sponge or similar material having appropriate elasticity and utilize its elastic force.

In the present embodiment, the polishing pads 24a and 24b and the optical disk 100 are rotated as follows: While the polishing pads 24a and 24b are in contact with the optical disk 100 with an appropriate pressure, the optical disk 100 is rotated by the motor 53, which makes the polishing pads 24a and 24b and the polishing pad holders 241 passively rotate due to the rotational stress. However, there are many alternatives for rotating the pads. For example, it is possible to actively rotate the polishing pads 24a and 24b and the polishing pad holders 241 by a motor, producing a passive rotation of the optical disk 100 by a stress. Actively rotating the parts on both sides is also possible. Another possibility is to actively rotate the part(s) on one side while braking the part(s) on the other side.

An actual restoration sequence is hereinafter described.

In the stand-by state of the restoration apparatus 10, the lid 20 is waiting in the open position, as shown by a broken line in FIG. 1.

In this state, an optical disk 100 to be restored, with its readout surface directed upwards, is set on the restoration table 21, and the lid 20 is closed to initiate the restoration process. At the beginning of this process, according to an instruction from the controller 22, the motor 53 begins to rotate and, simultaneously, the polishing agent supply pump 40 initiates its operation to supply the polishing agent, one or a few drops at a time, from the two polishing agent supply nozzles 26a and 26b onto the top surface of the optical disk 100 at predetermined timings. The polishing agent penetrates into the interface between the rotating optical disk 100 and the polishing pads 24a and 24b. Thus, the polishing process begins.

The polishing action generates a frictional heat in the optical disk 100 and the polishing pads 24a and 24b. This heat vaporizes the moisture in the polishing agent, causing the polishing agent to dry.

A dried polishing agent can no longer grind the optical disk 100. Therefore, after the lapse of an appropriate period of time, the controller 22 activates the polishing water supply pump 30 to supply water (polishing water), one or a few drops at a time, onto the top surface of the optical disk 100 at predetermined timings. Similar to the polishing agent, the polishing water dropped onto the top surface of the rotating optical disk 100 penetrates into the interface between the optical disk 100 and the polishing pads 24a and 24b. In this manner, the polishing agent is prevented from drying and its grinding capability is maintained for a long period of time. Replenishing the polishing agent at appropriate timings also helps the strong grinding capability to continue for a long period of time.

When the restoration by the grinding process is nearly completed, the controller 22 discontinues the supply of the polishing agent and polishing water, while maintaining the rotation of the optical disk 100 by the motor 53. As a result, the water remaining on the polishing pads 24 and the optical disk 100 is vaporized by the frictional heat generated between the polishing pads 24 and the optical disk 100. This creates a state where the optical disk 100 is rubbed with dry polishing pads 24. Continuing this state for a long period of time will cause the optical disk 100 to be melted or deformed by the heat. Therefore, this state is continued for only an appropriately short period of time, during which the polishing agent and other residuals on the optical disk 100 are wiped off by the polishing pads 24a and 24b. Thus, the top surface of the optical disk 100 is cleaned.

After the restoration is completed, if the lid 20 is opened after the rotation of the motor 53 is discontinued with the polishing pads 24a and 24b still in contact with the optical disk 100, the polishing pads 24a and 24b tend to leave footprints on the optical disk 100. Accordingly, before de-energizing the motor 53, the controller 22 should preferably open the lid 20 by the lid-opening mechanism 23 to bring the polishing pads 24a and 24b out of contact with the optical disk 100. This operation prevents the polishing pads 24 from leaving footprints on the readout surface of the optical disk 100.

The polishing agent supply pump 40 for supplying the polishing agent is hereinafter described.

Figure 3:
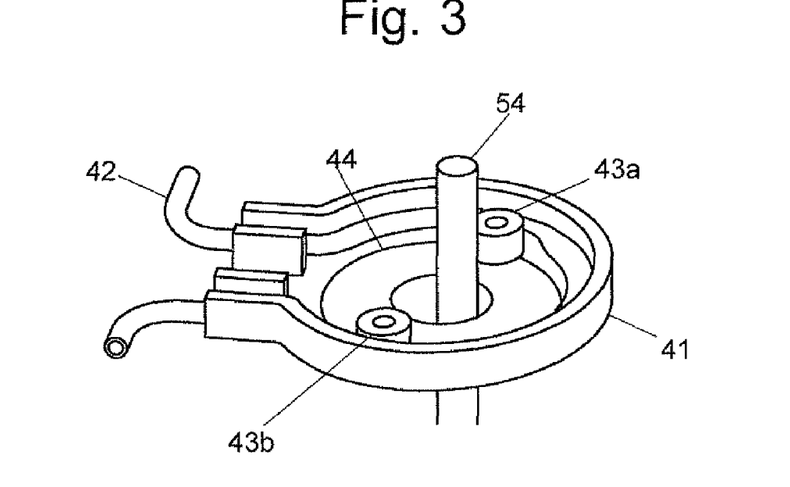
FIG. 3 is a perspective view showing the structure of a polishing agent supply pump.

FIG. 3 is a perspective view schematically showing the polishing agent supply pump 40. The housing 41 is shaped like a partially opened ring having an inner wall along which a tube 42 made of a flexible resin is extended as a passage for the polishing agent. Located inside the housing 41 is a rotor 44 with a central hole, through which the shaft 54 of the motor 53 is inserted. The rotor 44 has a plurality of rollers 43a and 43b in its edge. These rollers 43a and 43b are arranged to squeeze the tube 42 against the inner wall of the housing 41. The rotor 44 is linked to the motor 53 via a speed reducer 51, which will be described later. When the speed reducer 51 is in a predetermined state (to be described later), the rotation of the motor 53 produces a corresponding rotation of the rotor 44.

Figure 4:
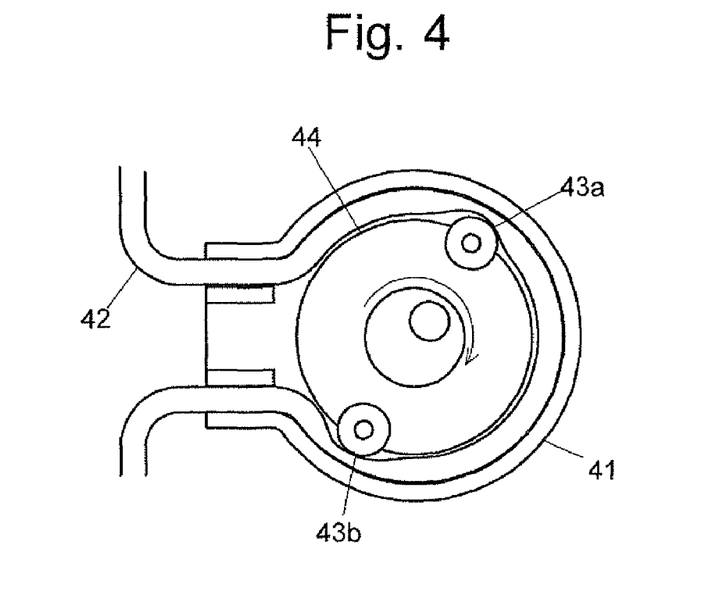
FIG. 4 is a plan view of the core parts of the polishing agent supply pump.

FIG. 4 is a plan view of the polishing agent supply pump 40. When the rotor 44 rotates in the direction of the arrow, the squeezed points of the tube 42 move in the same direction, pushing the contents inside the tube 42 in the same direction. This is a so-called tube pump, which operates without bringing its contents (i.e. the transport objective) into contact with a valve, piston or other mechanical elements that are accompanied by a friction or sliding action. Such a pump is suitable to handle a polishing agent or similar substance that may possibly grind anything coming in contact with it.

Figure 5:
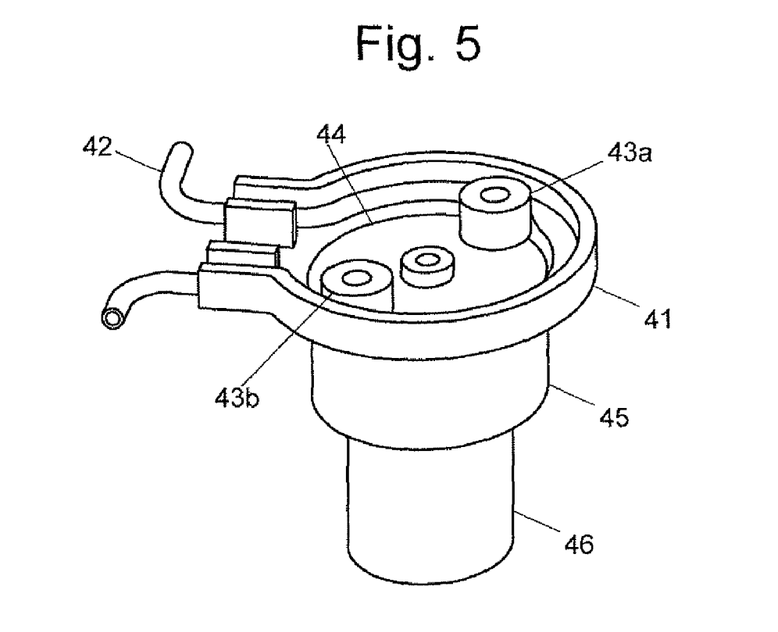
FIG. 5 is a perspective view of a commonly used tube pump.

The polishing agent supply pump 40 shown in FIG. 1, which is a tube pump of the present embodiment, is driven by the motor 53 for turning the optical disk 100 with a speed reducer 51 for reducing the speed of the rotary motion of the motor 53. Its pumping action can be turned on and off by the electromagnetic solenoid 59. Alternatively, a commonly used tube pump consisting of a motor 46 integrated with a speed reducer 45, as shown in FIG. 5, may be used as the polishing agent supply pump. In this common tube pump, the pumping action is turned on and off by activating or deactivating the motor 46 separate from the motor 53 for rotating the optical disk 100.

Figure 6:
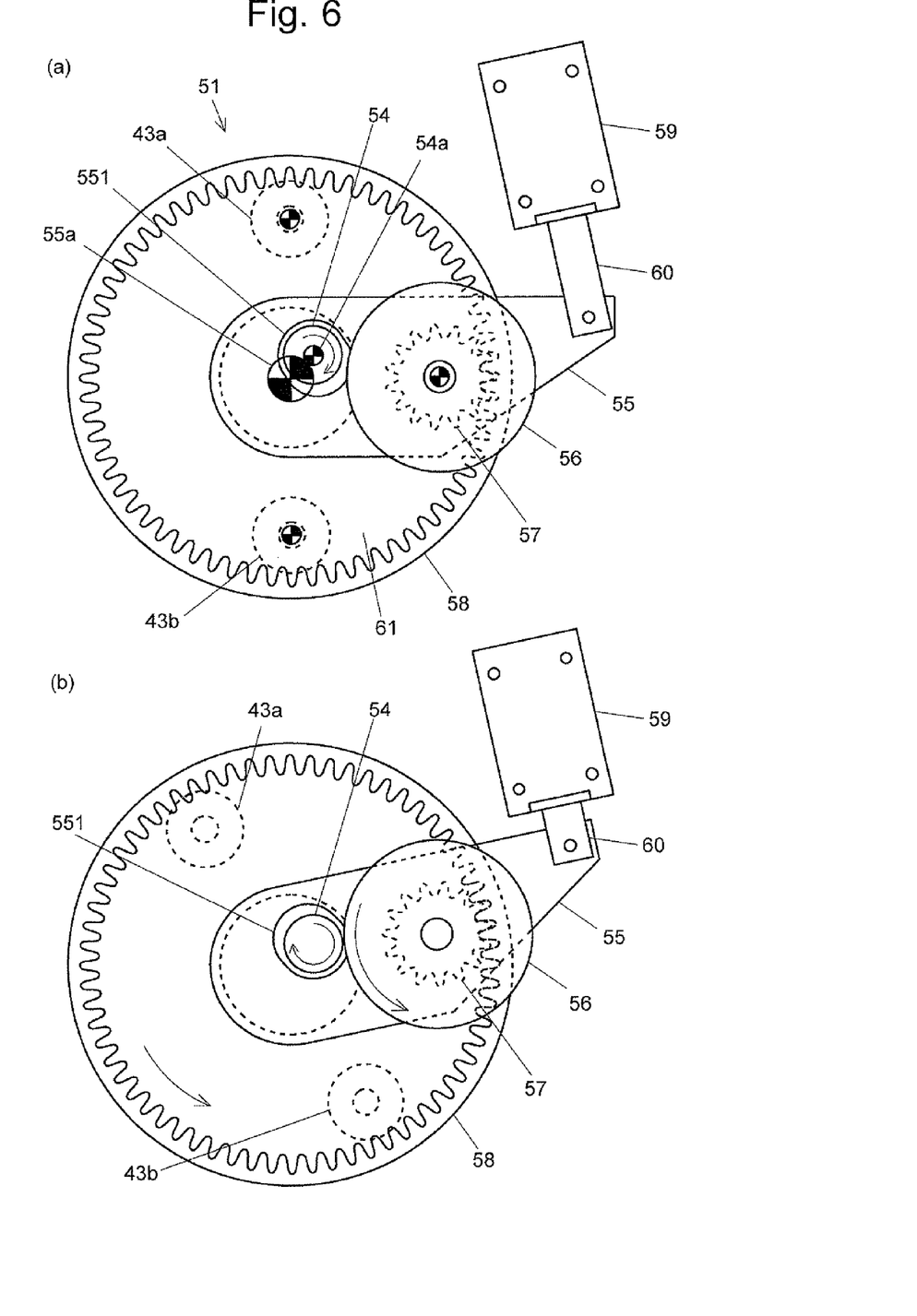
FIG. 6 is a model diagram illustrating an operation of a built-in tube pump in an optical disk restoration apparatus according to the present invention, where (a) shows the non-operating state and (b) shows the operating state.

An operation of the speed reducer 51 of the polishing agent supply pump 40 of the present embodiment is hereinafter described with reference to FIGS. 1, 6(a) and 6(b).

At the center of the speed reducer 51, there is the shaft 54 of the motor 53. This shaft 54 is inserted through an elliptic through-hole 551 formed in a plate-shaped lever 55. An idler wheel 56 is attached to the center of the upper surface of the lever 55 in a free-to-rotate manner. The plunger 60 of the electromagnetic solenoid 59 is linked to the end of the lever 55.

When the plunger 60 moves back and forth, the lever 55 makes a reciprocating motion around the point 55a, which is displaced from the rotation center of the shaft 54, within a range where the shaft 544 and through-hole 551 do not touch each other on their sides. According to this reciprocating motion, the idler 56 and the shaft 54 become separated (FIG. 6(a)) or connected (FIG. 6(b)).

The rotation shaft of the idler 56 penetrates through the lever 55, with an external gear 57 connected to its lower end. The external gear 57 is surrounded by an internal gear 58, which turns around a point that coincides with the rotation center of the lever 55 (i.e. point 55a). The internal gear 58 is permanently engaged with the external gear 57. A disk 61 having a central opening is fixed to the lower surface of the internal gear 58, and the rollers 43a and 43b are attached to the lower side of the disk 61 in a free-to-rotate manner.

To drive the polishing agent supply pump 40, the controller 22 energizes the solenoid 59 to pull the plunger 60 backward and rotate the lever 55 counterclockwise, as shown in FIG. 6(b). As a result, the idler 56 and the shaft 54 come in contact with each other on their sides, transmitting the rotary motion of the shaft 54 to the idler 56. The external gear 57 linked with the idler 56 receives the rotary motion and eventually rotates the internal gear 58.

If the diameter of the shaft 54 is 10 mm, the diameter of the idler 56 is 40 mm, the number of teeth of the external gear 57 is 15 and the number of teeth of the internal gear 58 is 60, the internal gear 58 rotates at a speed of one-sixteenth of the speed of the shaft 54.

The rotation of the inner gear 58 causes the aforementioned rollers 43a and 43b of the tube pumps (FIGS. 3 and 4) to turn, squeezing the tube 42 against the inner wall of the housing 41.

In this manner, while the solenoid 59 is energized, the polishing agent supply pump 40 functions as a tube pump using the motor as the driving source and feeds the polishing agent in the polishing agent tank to the polishing agent supply nozzle 26. While the solenoid 59 is not energized, the plunger 60 is returned to its original position (i.e. the position shown in FIG. 6(a)) by the action of a spring (not shown), to separate the idler 56 from the shaft 54, with the rollers 43a and 43b halted at that position. Thus, the polishing agent supply pump 40 discontinues its operation.

In the present invention, two polishing pads 24a and 24b are used. To equally supply the polishing agent and polishing water to both pads, the two polishing agent supply nozzles 26a and 26b are symmetrically arranged with respect to the central point of the optical disk 100. In this arrangement, it is not preferable to use a single tube 42 having two branches with the two polishing agent supply nozzles 26a and 26b respectively attached at their tips, because the amount of the polishing agent exiting from each nozzle becomes difficult to control, particularly when a high-viscosity polishing agent is used. Furthermore, when the pumping operation is discontinued, even the slightest difference in height between the tips of the nozzles can allow air to intrude into the higher nozzle, causing a leakage of the polishing agent from the other nozzle.

In the polishing agent supply pump 40 of FIG. 1, these problems are solved by using a separate tube 42 for each of the polishing agent supply nozzles 26a and 26b and passing the two tubes through the gaps between the housing 41 and the rollers 43.

Figure 7:
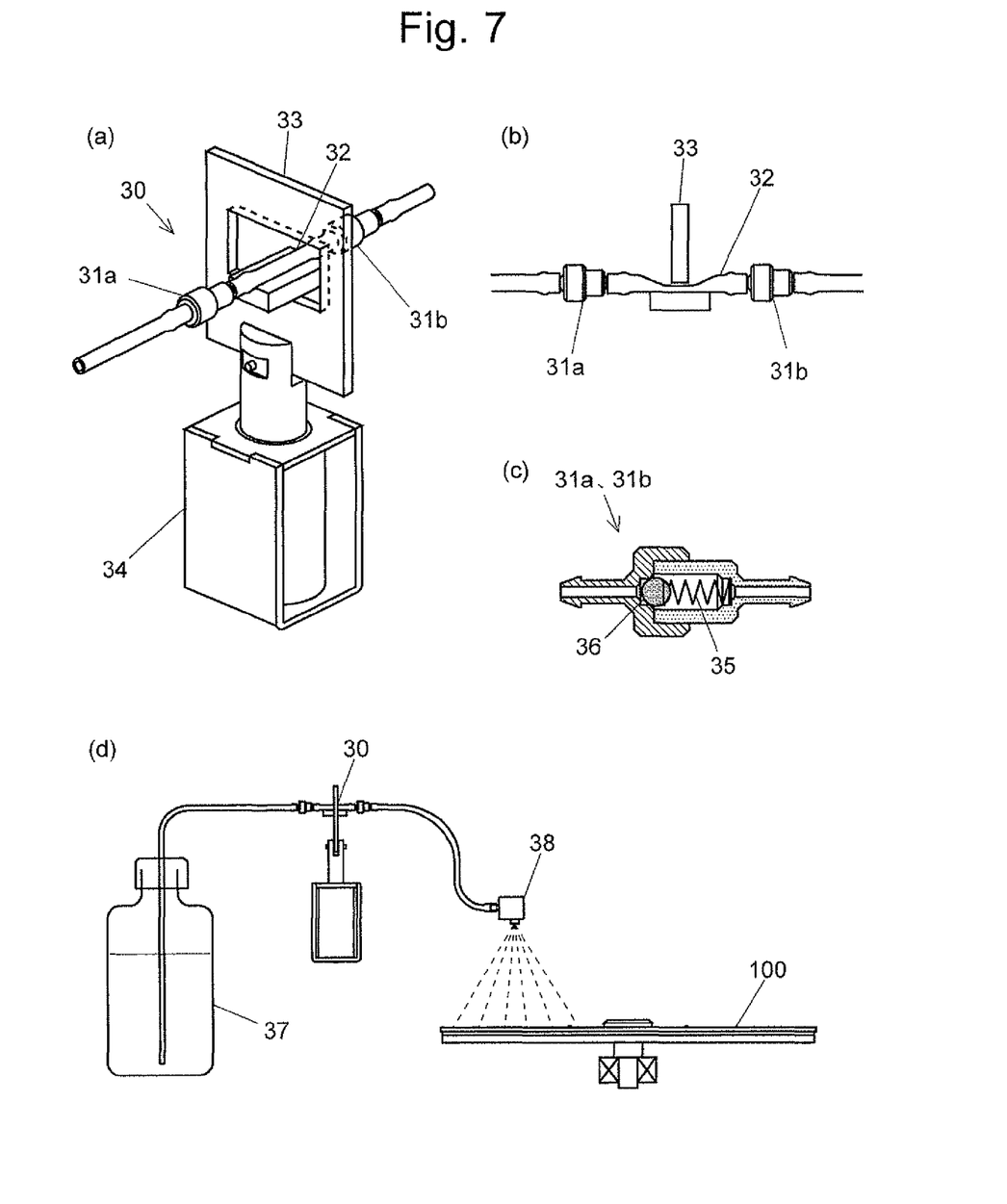
FIG. 7 is a model diagram showing the structure of a polishing water supply pump, where (a) is a perspective view of the pump section, (h) is a side view illustrating the principle of the pump, (c) is a sectional view showing an example of a valve, and (d) is an example of a configuration including a polishing water tank, a polishing water supply pump and a spray head.

When the pumping operation is discontinued, the polishing agent remaining at the tip of the polishing agent supply nozzle 26 may drip due to vibrations or other factors. This will eventually produce inconvenient results, such as incomplete wiping. To avoid this problem, it is desirable to perform a "suck back" operation as in the case of the polishing water supply pump 30 shown in FIG. 7(b) (which will be described later). That is, when the lever 55 is pulled by the solenoid 59 to activate the polishing agent supply pump 40, the solenoid 59 somewhat squeezes the tube 42 on the exit side of the polishing agent supply pump 40; then, when the solenoid 59 is returned to its original position to discontinue the pumping operation, the tube is released from the squeezed state. Thus, unnecessary droppings of the polishing agent can be prevented. A similar function can also be realized by rotating the motor 53 backwards while the polishing agent supply pump 40 is active.

The polishing water supply pump 30 is hereinafter described with reference to FIG. 7. The polishing water supply pump 30 is a pump for replenishing the polishing agent with water, which vaporizes due to the frictional heat generated by the polishing pads 24a and 24b and the optical disk 100. Discharging a large amount of water is not required; rather, the capability to supply a trace of water in a stable manner is essential. Another requirement for the pump is to have a high level of durability to operate multiple times for every restoration process.

FIG. 7(a) is a perspective view of the polishing water supply pump 30 devised to fulfill the aforementioned capabilities. This pump includes a tube 32 with two valves 31a and 31b at both ends for feeding the polishing water in one specific direction. As shown in FIG. 7(b), the pump sends water in the tube 32 in one direction by squeezing the tube 32 from one side by the pusher 33 and suctions the polishing water by disengaging the pusher 33.

FIG. 7(c) is a sectional view showing the structure of the valves 31a and 31b. In the present example, the valve function is created by a spring 35 and a ball 36. Various methods are available to create similar functions.

In the example shown in FIG. 7(a), an electromagnetic solenoid 34 is used to drive the pusher 33. Alternatively, a drive mechanism including a motor combined with a cam may be used to drive the pusher 33.

FIG. 7(d) shows the polishing water being supplied from the polishing water tank 37 onto the optical disk 100 via the polishing water supply pump 30. As shown, this system has a spray head 38 attached to the tip of the polishing water discharge port to evenly supply the polishing water over the surface of the optical disk. This is more preferable than the example shown in FIG. 1 in which the polishing water supply nozzles 27a and 27b for supplying the polishing water onto the optical disk 100 are shaped like a thin tube.

Due to the use of the spray nozzle with a spray head 38 and the polishing water supply pump 30 using the tube 32 whose internal pressure can be rapidly increased by the electromagnetic solenoid 34, the pressure inside the nozzle rises to high levels during the polishing water supply process, whereby an approximately equal amount of polishing water can be supplied from the spray nozzle. Since the discharge port of the spray nozzle is small, a surface tension can prevent air from intruding into the spray nozzle. Thus, the unnecessary droppings of the polishing water do not occur when the pump is halted.

It is desirable that the controller 22 regulates the amount or interval of discharging the polishing agent or polishing water according to an operational history of the apparatus and/or the temperature or humidity inside or around the apparatus.

For example, it is possible to record the operational history of the apparatus in a memory or similar device inside the controller 22 and control the supply of the polishing agent and the polishing water so that the liquid is supplied by a larger quantity when the first round of polishing operations of the day is initiated, and then, in the second and subsequent rounds, the quantity is controlled according to the number of previous polishing operations, the lapse time from the last operation and other information.

It is also possible to measure the temperature or humidity inside or around the apparatus by a temperature sensor 22a or humidity sensor 22b and control the supply of the polishing agent and the polishing water according to the measured value so as to supply the liquid by a larger quantity under the conditions where the polishing agent easily dries or by a smaller quantity under the conditions where the polishing agent hardly dries.

By these operations, the polishing agent and polishing water can be supplied by an appropriate quantity according to the conditions under which the polishing operation is performed.

The time required for removing scratches from the optical disk 100 depends on the depth of the scratches, the type of the polishing agent and other factors. Accordingly, the optical disk restoration apparatus 10 should preferably have the function of allowing an operator to specify the restoration time according to the state of the scratches and other conditions. As one preferable example, this function may be implemented in such a manner that, when an operator selects one of the restoration times which are predetermined in stages, the controller 22 controls the quantity or interval of discharging the polishing agent and the polishing water according to the selected restoration time. The quantity of the polishing agent to be supplied during the polishing process needs only to be comparable to the quantity necessary to maintain the amount of the polishing agent held in the polishing pad 24. The quantity of the polishing water to be supplied during the polishing process needs only to be comparable to the quantity whereby the polishing agent can be replenished with the water content evaporated due to the polishing heat.

For example, the apparatus may have three restoration modes, "one-minute mode", "two-minute mode" and "three-minute mode", which respectively require one, two and three minutes for restoration. In the one-minute mode, a period of 40 seconds from the beginning of the restoration is assigned to the polishing process, followed by a dry-rubbing process of 20 seconds. The polishing agent may be discharged at the beginning of the restoration and at 20 seconds from the beginning by 0.1 g each time, or at intervals of 10 seconds by 0.05 g each time. The polishing water is, for example, discharged by 0.04 g each time at intervals of approximately five seconds. It is possible to omit the supply of the polishing water at the beginning of the restoration and initiate the supply at approximately five minutes from the beginning of the restoration.

Of course, this is a mere example. The quantity of the liquid to be discharged one time may be increased while elongating the discharging interval, or conversely, the quantity may be decreased while shortening the discharging interval. The total amount of the liquid to be discharged may be increased or decreased. The discharging quantity and/or interval may be varied according to the operational history of the apparatus, the temperature, humidity and other factors. The discharging quantity per one time and/or the discharging interval may be changed according to the restoration mode. The restoration time may be changed continuously rather than discretely. The discharging operation does not need to be periodical but needs only to be intermittent.

The 20-second period for the dry-rubbing process is also a mere example. It may be shortened (e.g. to 10 seconds) when the air is dry, or elongated (e.g. to 30 seconds) when the polishing pads 24 are considerably wet as in the case of the three-minute mode or in the case where the restoration operation has been already performed many times.

As described to this point, the optical disk restoration apparatus 10 according to the present invention requires a user to simply place an optical disk 100 on the restoration table 21 and close the lid 20, after which the restoration of the optical disk 100 is initiated. When the restoration is completed, the optical disk is cleanly polished.

Specifically, in the final stage of the restoration, the controller 22 controls the on/off operation of the motor 53, polishing agent supply pump 40 and polishing water supply pump 30 to rotate the polishing pad 24 and the optical disk 100 without supplying the polishing water and the polishing agent. In this process, the disk surface is dried by the frictional heat generated between the polishing pads 24 and the optical disk 100, and the optical disk 100 is rubbed with the polishing pads 24. In this manner, the restored optical disk 100 can be cleaned without consuming the time and labor of the user. Thus, the working efficiency is extremely enhanced.

The present apparatus is a dry-type restoration apparatus for performing a polishing process using the polishing pads 24 with a polishing agent held therein, and yet has the polishing agent supply pump 40 for intermittently supplying the polishing agent to the interface between the polishing pads 24 and the optical disk 100 during the polishing process as well as the polishing water supply pump 30 for intermittently replenishing the polishing agent with moisture evaporated by frictional heat. By this mechanism, the amount and physical properties of the polishing agent at the interface between the polishing pads 24 and the optical disk 100 are appropriately maintained for a long period of time, so that the restoration capability is higher than that of conventional dry-type restoration apparatuses.

Such a high level of restoration capability can also be achieved by using only the polishing agent supply pump 40 without the help of the polishing water supply 30, in which case, however, the restoration cost will be very high because the expensive polishing agent is used in large quantity. Furthermore, using a large amount of polishing agent rapidly contaminates the polishing pads 24a and 24b, so that the polishing pads 24a and 24b must be frequently replaced. These problems can be solved by using the polishing water supply pump 30 as in the restoration apparatus 10 according to the present invention.

The present invention is not limited to the previously described embodiment, which can be appropriately modified within the spirit of the present invention. For example, the polishing agent and polishing water may be supplied to the polishing pads instead of the readout surface of the optical disk. The polishing water does not always need to consist of water only; for example, it may be water containing a trace of a surface active agent, or a mixture of water and alcohol or similar volatile liquid having a surface-activating effect.

EXPLANATION OF NUMERALS

10 . . . Restoration Apparatus
20 . . . Lid
21 . . . Restoration Table
22 . . . Controller
22a . . . Temperature Sensor
22b . . . Humidity Sensor
23 . . . Lid-Opening Mechanism
24a, 24b . . . Polishing Pad
241 . . . Polishing Pad Holder
26a, 26b . . . Polishing Agent Supply Nozzle
27a, 27b . . . Polishing Water Supply Nozzle
28 . . . Bearing
30 . . . Polishing Water Supply Pump
31a, 31b . . . Valve
32 . . . Tube
33 . . . Pusher
34, 59 . . . Electromagnetic Solenoid
37 . . . Polishing Water Tank
38 . . . Spray Head
40 . . . Polishing Agent Supply Pump
41 . . . Housing
42 . . . Tube
43a, 43b . . . Roller
44 . . . Rotor
45, 51 . . . Speed Reducer
46, 53 . . . Motor
47 . . . Polishing Agent Tank
54 . . . Shaft
55 . . . Lever
56 . . . Idler
57 . . . External Gear
58 . . . Internal Gear
60 . . . Plunger
61 . . . Disk
100 . . . Optical Disk
120 . . . Substrate
130 . . . Information Record Layer
140 . . . Cover Layer
150 . . . Hard Coat Layer
160 . . . Scratch

The invention claimed is:

1. A dry-type optical disk restoration apparatus for polishing a readout surface of an optical disk to be restored, by rotating a polishing pad holding a polishing agent and the optical disk relative to each other in a contact state, comprising:
   a) a polishing agent supply means for supplying a polishing agent to the readout surface of the optical disk or the polishing pad;
   b) a polishing water supply means for supplying a polishing water to the readout surface of the optical disk or the polishing pad; and
   c) a supply control means for intermittently operating the polishing agent supply means to maintain an amount of the polishing agent held in the polishing pad during a polishing process, and for intermittently operating the polishing water supply means to replenish the polishing agent with moisture evaporated by a polishing heat.

2. The optical disk restoration apparatus according to claim 1, further comprising:
   a) a lid on an inside face of which a polishing pad holder holding the polishing pad is attached;
   b) a lid-opening mechanism for opening the lid; and
   c) a lid-opening control means for activating the lid-opening mechanism after a polishing process of the optical disk is completed.

3. The optical disk restoration apparatus according to claim 2, wherein the lid-opening control means activates the lid-opening mechanism before a rotation of the optical disk is discontinued.

4. The optical disk restoration apparatus according to claim 1, wherein the polishing agent supply means includes:
   a) a plurality of polishing agent supply nozzles each serving as a discharge port of the polishing agent; and
   b) a polishing agent supply pump for supplying the polishing agent to each of the polishing agent supply nozzles through passages individually provided for each polishing agent supply nozzle.

5. The optical disk restoration apparatus according to claim 4, wherein the polishing agent supply means has a suck back function in which a squeezing of a tube for supplying the polishing agent is released for preventing unnecessary droppings of the polishing agent.

6. The optical disk restoration apparatus according to claim 1, further comprising a rotation discontinuation control means for controlling a timing of discontinuing a rotation of the optical disk and the polishing pad, wherein:
   a) the supply control means discontinues a supply of the polishing agent and the polishing water when a polishing process of the optical disk is completed; and
   b) when a predetermined period of time has elapsed after the supply of the polishing agent and the polishing water has been discontinued by the supply control means, the rotation discontinuation control means discontinues the rotation of the optical disk and the polishing pad so as to dry the polishing agent at an interface between the optical disk and the polishing pad by a polishing heat and perform dry-rubbing of the optical disk with the polishing pad.

7. The optical disk restoration apparatus according to claim 1, wherein the polishing water supply means includes:
   a) a flexible tube provided with a valve at each of two ends thereof, the valve being designed to allow the polishing water to flow in a predetermined direction;
   b) a pusher located on a side of the tube; and
   c) a drive mechanism for operating the pusher so as to feed the polishing water inside the tube in the predetermined direction by squeezing tube from a side with the pusher.

8. The optical disk restoration apparatus according to claim 1, wherein the supply control means includes a discharge condition regulating means for regulating the amount or interval of discharging the polishing agent or the polishing water.

9. The optical disk restoration apparatus according to claim 8, wherein:
   a record means for recording an operational history of the apparatus is provided; and
   the discharge condition regulating means regulates the amount or interval of discharging the polishing agent or the polishing water according to the operational history recorded in the record means.

10. The optical disk restoration apparatus according to claim 8, further comprising:
    a measurement means for measuring a temperature or humidity is provided, wherein
    the discharge condition regulating means regulates the amount or interval of discharging the polishing agent or the polishing water according to a measured value of the measurement means.

11. An optical disk restoration method including a dry polishing process for polishing a readout surface of an optical disk by rotating a polishing pad holding a polishing agent and the optical disk relative to each other in a contact state, wherein the polishing process includes:
    a) a polishing agent supply process for intermittently supplying the polishing agent to the readout surface of the optical disk or the polishing pad to maintain an amount of the polishing agent held in the polishing pad during the polishing process; and
    b) a polishing water supply process for intermittently supplying a polishing water to the readout surface of the optical disk or the polishing pad to replenish the polishing agent with moisture evaporated by a polishing heat.

12. The optical disk restoration apparatus according to claim 4, wherein the polishing agent supply means has a suck back function in which a motor of the polishing agent supply pump rotates backwards for preventing unnecessary droppings of the polishing agent.

* * * * *

US 8,342,905 C1

(12) EX PARTE REEXAMINATION CERTIFICATE (10754th)
United States Patent
Miyahara et al.

(10) Number: US 8,342,905 C1
(45) Certificate Issued: Nov. 5, 2015

(54) OPTICAL DISK RESTORATION METHOD AND APPARATUS

(75) Inventors: Takakazu Miyahara, Minamisatsuma (JP); Terumasa Miyahara, Minamisatsuma (JP); Kazutoshi Chijiiwa, Minamisatsuma (JP)

(73) Assignee: ELM INC., Minamisatsuma-Shi, Kagoshima (JP)

Reexamination Request:
No. 90/020,082, Feb. 18, 2015

Reexamination Certificate for:
Patent No.: 8,342,905
Issued: Jan. 1, 2013
Appl. No.: 12/679,427
PCT Filed: Aug. 31, 2009
PCT No.: PCT/JP2009/004270
§ 371 (c)(1),
(2), (4) Date: Mar. 22, 2010
PCT Pub. No.: WO2011/024241
PCT Pub. Date: Mar. 3, 2011

(51) Int. Cl.
*B24C 3/00* (2006.01)
*B24B 37/015* (2012.01)

(52) U.S. Cl.
CPC .................................. *B24B 37/015* (2013.01)

(58) Field of Classification Search
USPC ................................................ 451/2, 41, 285
See application file for complete search history.

(56) References Cited

To view the complete listing of prior art documents cited during the proceeding for Reexamination Control Number 90/020,082, please refer to the USPTO's public Patent Application Information Retrieval (PAIR) system under the Display References tab.

*Primary Examiner* — Matthew C Graham (57) ABSTRACT

An optical disk restoration apparatus and optical disk restoration method are provided, which are capable of achieving a high level of capability of restoring a scratched optical disk, without consuming the time and labor of an operator, while reducing the production cost of the apparatus. During a polishing process, an appropriate amount of a polishing agent is dropped onto the readout surface of the optical disk by a polishing agent supply pump to continuously supply the polishing agent to the interface between the optical disk and polishing pads, while a polishing water supply pump is operated to replenish the polishing agent with moisture evaporated by the polishing heat. By this mechanism, the amount and physical properties of the polishing agent at the interface between the optical disk and the polishing pads are appropriately maintained for a long period of time, so that the restoration capability is maintained at high levels.

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 2 and 4-12 is confirmed.

Claim 3 was not reexamined.

* * * * *